United States Patent
Gregg et al.

[11] Patent Number: 5,963,195
[45] Date of Patent: *Oct. 5, 1999

[54] HARDWARE-SELECTABLE MOUSE MOVEMENT

[75] Inventors: Leon Edward Gregg, Rochester, Minn.; Julianne Frances Haugh; William Jaaskelainen, Jr., both of Austin, Tex.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/770,217

[22] Filed: Dec. 19, 1996

[51] Int. Cl.⁶ .............................. G06F 3/033; F09F 5/08
[52] U.S. Cl. ........................................... 345/159; 345/163
[58] Field of Search ........................... 345/159, 163–167; 463/36–38

[56] References Cited

U.S. PATENT DOCUMENTS

| | | | |
|---|---|---|---|
| 4,698,626 | 10/1987 | Sato et al. | 345/166 |
| 5,153,571 | 10/1992 | Takahashi | 345/163 |
| 5,313,229 | 5/1994 | Gilligan et al. | 345/163 |
| 5,374,942 | 12/1994 | Gilligan et al. | 345/163 |

FOREIGN PATENT DOCUMENTS

| | | | |
|---|---|---|---|
| 56-145419 | 11/1981 | Japan | 345/159 |
| 60-97210 | 5/1985 | Japan | 345/164 |
| 60-153538 | 8/1985 | Japan | 345/163 |
| 60-209831 | 10/1985 | Japan | 345/164 |

*Primary Examiner*—Jeffery Brier
*Attorney, Agent, or Firm*—Leslie A. Van Leeuwen; Jack V. Musgrove; Andrew J. Dillon

[57] ABSTRACT

An improved pointer device, such as a mouse, for a computer system having a video display that uses a moving graphical pointer. The pointer device has switches or dials that allow independent adjustment of mouse speed and acceleration. Separate adjustments can be made for X and Y axes of motion of the mouse. Since the adjustment functionality is built into the hardware of the mouse, the mouse user is able to easily configure mouse behavior without navigating various menus and panels in software drivers, providing functionality which may not otherwise be available on the user's system.

9 Claims, 3 Drawing Sheets

HARDWARE-SELECTABLE MOUSE MOVEMENT

BACKGROUND OF THE INVENTION

1. Field of the Invention

The present invention generally relates to computer systems and, more particularly, to pointing devices for visual displays, such as those commonly referred to as a "mouse." The present invention is directed to hardware for such a graphical pointing device which imparts additional functionality without requiring special software drivers.

2. Description of the Prior Art

A computer system includes many components, such as the central processing unit (or processor), temporary memory for storing program instructions (like random access memory, or RAM), a permanent storage device (such as a hard disk), and a variety of user-interface devices, such as a video display, a keyboard, and a pointing device which controls the movement of a graphical pointer on the display. The graphical pointer is used to select certain areas on the screen, such as words in a text-only display, or icons in a more complicated graphical user interface (GUI). An area is selected by placing the graphical pointer over the area and then clicking one or more buttons on the pointing device. Other operations can be performed using the graphical pointer besides simple selection, such as "drag and drop" operations.

The pointing device, often referred to as a "mouse," can come in a variety of physical embodiments. The most familiar design is a hand-held unit having a ball therein which extends partially through a hole in the bottom of the unit, so that the unit can be pushed along a flat surface to cause the ball to roll. Transducers within the unit convert the motion of the ball to electrical signals which are transmitted to the processor (or a controller circuit connected to the processor), which, in turn, decodes those signals to determine how the graphical pointer on the display should be manipulated. Other physical embodiments of pointer devices include electrically sensitive pads, joysticks and joystick-type actuators, a track ball, etc.

Mouse movement, measured in units called "mickies," is a constant of the mouse itself. A certain mouse movement distance always results in the same number of mickies being reported to the host system. This fixed constant can cause problems when either large or small amounts of movement are desired. One user may find that a large movement is annoying, while another lacks the fine motor skills needed to move precise distances and directions. The current art uses software mouse drivers to control modifications to this behavior. For example, software commonly allows the user to adjust the sensitivity (i.e., speed) of the graphical pointer, such that it may be slowed down to allow finer movements, or sped up to move the pointer more quickly across the display screen. A similar software adjustment provides for "acceleration" of the graphical pointer, i.e., moving the pointer even more quickly based on the length of time that the pointer is being moved along a given direction.

While the software drivers for such pointers provide the advantage of adjusting speed and acceleration, it is often inconvenient to implement the software approach. For example, if a user is running one program, say a presentation graphics package that requires very fine pointer control, then the user must first open the software driver, make the adjustments, and return to the presentation graphics package to continue. Thereafter, if the user wishes to temporarily readjust the mouse to a less sensitive scale, then the mouse driver must again be opened and software adjustments made, leading to interruptions in program operation. Also, the availability and useability of mouse drivers is unpredictable, i.e., a given software driver might not be usable with all types of mice. Additionally, a desirable software mouse driver may not be available for all combinations of computer hardware and software. Finally, changes to an operating system may make an older mouse driver non-functional. It would, therefore, be desirable to devise a pointer device which eliminates the need for software drivers that are not universally available and can become obsolete. It would be further advantageous if the device were compatible with any software operating system, and did not require navigating various software menus and panels to change mouse behavior.

SUMMARY OF THE INVENTION

It is therefore one object of the present invention to provide an improved pointer device for a computer system having a graphic display.

It is another object of the present invention to provide such a pointer device that can provide quick and easy adjustments, such as speed and acceleration, without interrupting program operation.

It is yet another object of the present invention to provide such a pointer device that is universally adaptable without the need for software drivers.

The foregoing objects are achieved in a pointer device generally comprising a movement device, such as a roller ball or joystick-type lever, which is either integrated into the computer body or housed in a separate body (a mouse), sensors which convert user manipulation of the movement device into electrical signals representing motion of the graphical pointer, and switch means for selectively modifying the electrical signals, in response to manual control, to adjust the movement of the graphical pointer. The switch means can affect the speed (sensitivity) of the mouse, or provide acceleration. In the embodiment wherein acceleration is provided, it can be a simple on/off switch or have several different acceleration settings or have many settings to provide effectively continuous adjustment of the acceleration of the movement of the graphical pointer. In the embodiment wherein speed adjustment is provided, such adjustment can be refined to allow separate sensitivity adjustments for X and Y axes. In this manner, the mouse user is able to easily configure mouse behavior without navigating various menus and panels in software drivers, providing functionality which may not otherwise be available on the user's system, and additionally accommodating those users who wish to further refine mouse response along the orthogonal axes.

The above, as well as additional objectives, features, and advantages of the present invention, will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
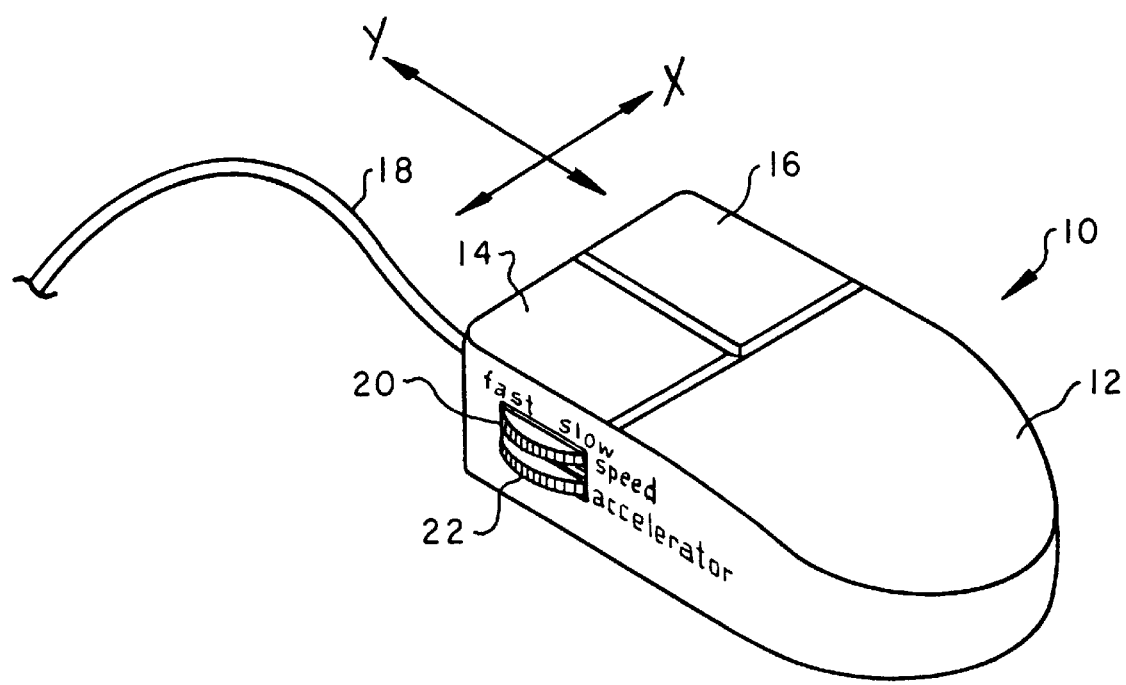
FIG. 1 is a perspective view of a mouse-type pointer device for a computer system, made in accordance with the present invention.

With reference now to the figures, and in particular with reference to FIG. 1, there is depicted one embodiment 10 of the pointer device of the present invention. Pointer device 10 is exemplary of various types of devices to which the present invention is applicable, as further noted below in conjunction with FIG. 2. Pointer device 10 is a mouse-style pointer generally comprised of a body 12 (usually sized to fit comfortably in a hand) having one or more buttons 14, 16, and a roller ball (not visible in FIG. 1) which partially extends through a hole in the underside of body 12. When body 12 is pushed along a relatively flat surface, the roller ball's movements are sensed and appropriate signals are generated and sent to the computer system via wire 18 (transmission can also be wireless, e.g., radio wave or infrared). The foregoing aspects of mouse 10 are generally known in the prior art, and may be implemented in any conventional fashion. The signals are typically sensed by an input/output (I/O) controller which is connected to the computer's central processing unit (CPU); the CPU interprets the signals and sends appropriate data to a display adapter which then causes "movement" of the graphical pointer on the display.

The novel features of mouse 10 which are visible in FIG. 1 include two dials 20 and 22 which are used to control the mouse response. Specifically, dial 20 is used to adjust the mouse speed, and dial 22 is used to adjust the mouse acceleration. Speed refers to the basic sensitivity of device 10, i.e., how quickly the graphical pointer on the display screen will move in response to a given movement of mouse 10. In other words, when the mouse moves its minimum distance (one "mickie"), the graphical pointer on the display will move a certain amount. The amount of on-screen movement per mickie is generally a function of the software driver that the computer system uses to interface with the mouse. Acceleration refers to the additional manipulation of the graphical pointer based on the rate of movement of the pointer device. In other words, if a pointer device uses no acceleration, then the graphical pointer on the display screen will move a constant amount for a given distance of mouse movement regardless of the rate at which the mouse moves; if the pointer device uses acceleration, then the graphical pointer will move a larger amount on the screen if the pointer device is moved more quickly than if it is moved slowly (even though it is moved across the same physical distance).

In some prior art systems, the software driver can be used to adjust mouse speed and acceleration but, in the present invention, electronics are added to the mouse itself (as discussed further below in conjunction with FIG. 3) so that the operating characteristics of the mouse are contained in and controlled by the mouse. This eliminates the need for software drivers which are not universally available and can become obsolete. The electronics added to the mouse first control the speed or "sensitivity" (the number of mickies per unit of movement) of the mouse. The control of sensitivity can be accomplished using dial 20 to modify the ratio of the number of mickies reported to the system for a unit of physical mouse movement. Use of a thumb-wheel-type dial allows easy and quick adjustment. Other types of physical switches or dials can be used, and placed elsewhere, such as on the underside of body 12.

After setting the mouse speed, the electronics further modify the signal in a non-linear manner in response to the amount of acceleration selected via dial 22. Dial 22 can also take on other forms, such as a rocker switch which allows only on/off acceleration. The addition of a non-linear response imparts the benefits of both rapid long-distance movement and fine control for precise positioning. With a non-linear response activated, the "sensitivity" adjustment is made as before, mapping a unit of physical movement to some number of mickies to be reported to the system but now, in addition, a second mapping is done based on the current movement velocity. If the mouse is moving slowly, there is no change in the number of mickies reported. However, as the velocity increases, the number reported to the system is increased non-linearly.

Figure 2:
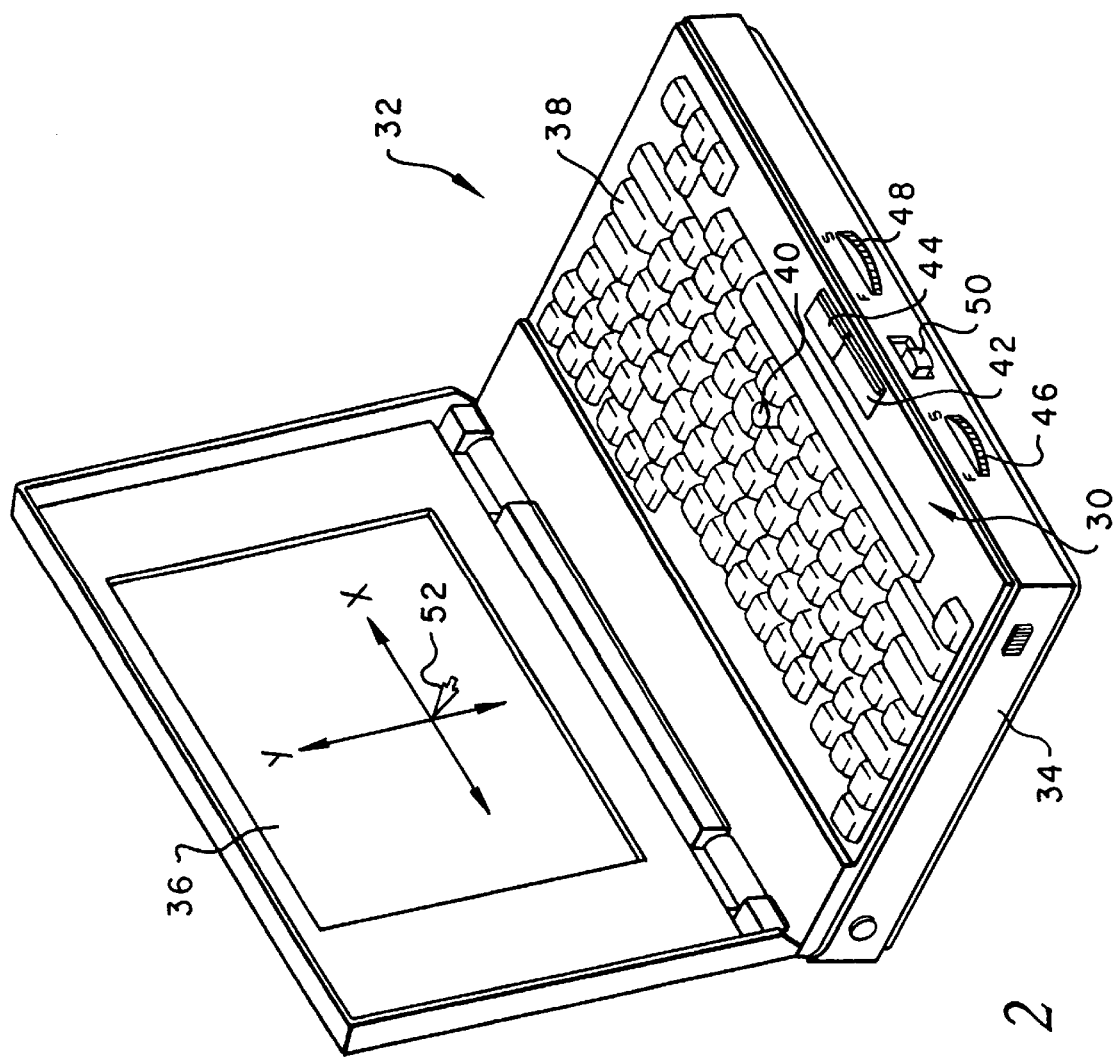
FIG. 2 is a perspective view of a notebook-type computer having a pointer device made in accordance with the present invention.

FIG. 2 illustrates an alternative embodiment 30 of the pointer device of the present invention, adapted for use with a notebook computer 32. Notebook 32 has a body 34 with a video display 36 attached thereto (it can be removably attached), and a keyboard 38. Pointer device 30 includes a joystick-type lever 40 (such as that sold by International Business Machines Corporation under the trademark TrackPoint) having an associated pressure sensor, and one or more buttons 42, 44. The foregoing aspects of pointer device 30 and computer 32 are generally known in the prior art, and may be implemented in any conventional fashion. The details of computer 32 are beyond the scope of the present invention; it is included to illustrate one of many alternative pointing devices that may be used according to the present invention.

The additional, novel features of pointer device 30 include two dials 46 and 48 and a two-position slider switch 50. Dials 46 and 48 are used to adjust the mouse speed, similar to dial 20 for mouse 10, but dials 46 and 48 provide separate adjustment for two (orthogonal) axes X and Y, respectively, which are illustrated in FIG. 2 on display 36, along with a representation 52 of the graphical pointer. Conventional pointer devices send a pair of signals corresponding to the number of mickies of movement for each such axis. The present invention takes advantage of this construction of pointer devices which makes it easy to separately adjust mouse response along these two axes. In other words, dial 46 is used to adjust sensitivity along the X axis, and dial 48 is used to adjust sensitivity along the Y axis. The same functionality can be provided for mouse 10 by providing two dials in place of dial 20. Having separate control for different axes in such a hand-held mouse may particularly alleviate problems associated with repetitive-stress injuries (carpal tunnel syndrome).

Slider switch 50 is similar to dial 22 of mouse 10 in that it provides for acceleration of mouse movement. In this implementation, only two settings for switch 50 are provided, on and off.

Figure 3:
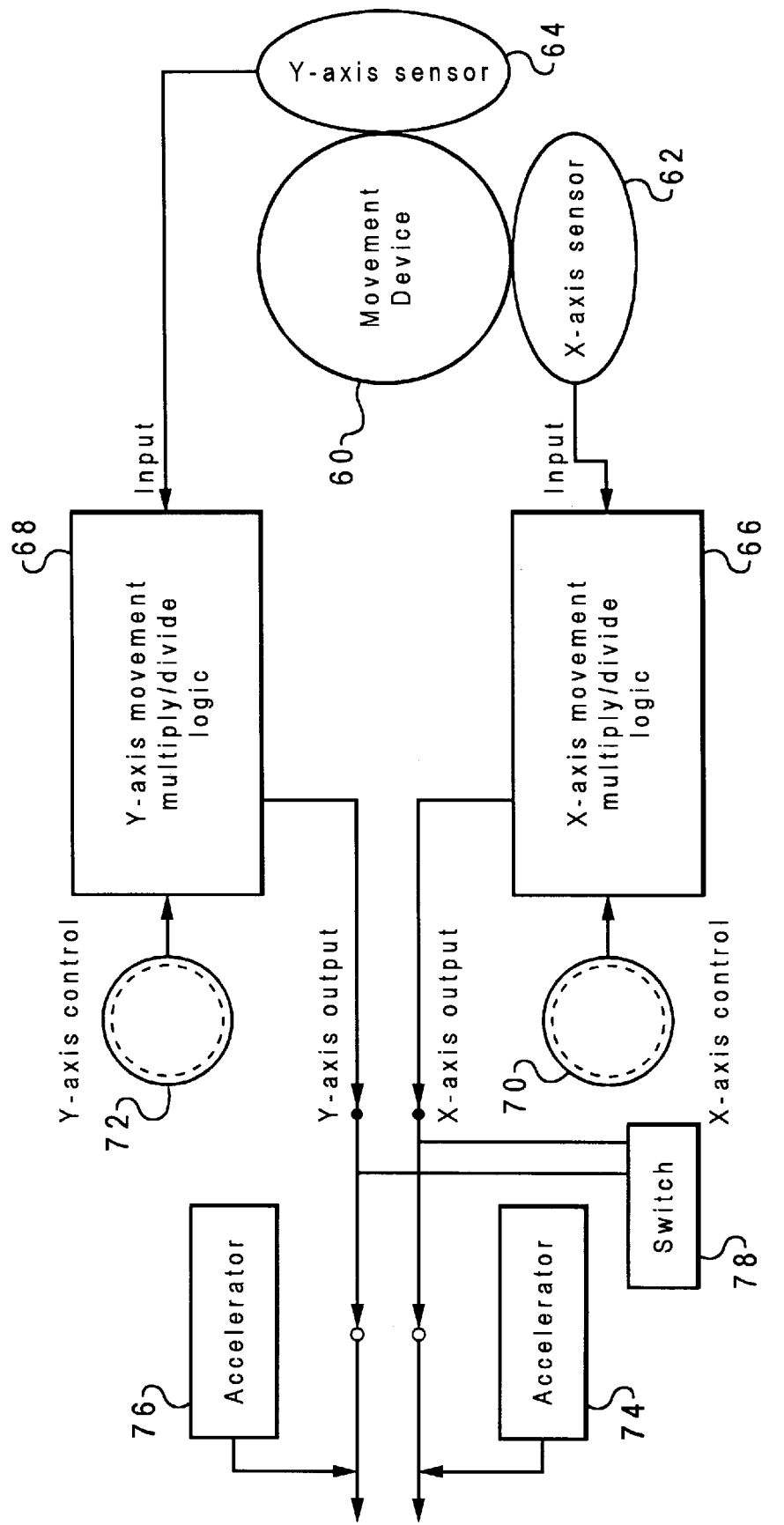
FIG. 3 is a block diagram depicting the primary components of the pointer device of the present invention.

FIG. 3 is a block diagram depicting the basic construction of the electrical components associated with a pointer device made in accordance with the present invention. All of these components are housed inside the pointer device, e.g., within body 12 of mouse 10 or within body 34 of computer 32. Operation of the device begins with the user manipulating the movement device 60 (i.e., sliding mouse 10 to cause the ball inside to roll, or pushing on joystick 40). Movement (or pressure) is picked up by two sensors 62, 64 which separate the motion into two components, associated with the orthogonal axes. Output from these sensors is indicative of the rate of movement (or the amount of force being applied) in the direction of the axis. The nature of sensors 62, 64 depends on the type of pointer device being used; for example, a device such as mouse 10 can use a conventional optomechanical transducer having a roller which contacts the ball inside mouse 10 and turns a wheel having a plurality of slots or holes therein; light pulses from an LED (light-emitting diode) pass through the holes in the wheel and are sensed by a photodiode that generates square wave pulses. This construction is discussed further in U.S. patent application Ser. No. 08/581,856, which is hereby incorporated.

The output of the sensors 62, 64 are directed to the inputs of respective speed adjustment circuits 66, 68 which are used to adjust the signals. For example, each mickie of movement along a given axis results in the corresponding sensor sending a single pulse to its associated logic circuit. The logic circuits multiply or divide the number of actual signals received to generate an adjusted signal, based on the sensitivity selected by controls 70, 72 (e.g., dials 46 and 48). Controls 70, 72 may be analog inputs, such as a variable resistor controlled by the dial or a digital input such as a rotary switch providing a BCD value for the modification factor.

The implementation of the sensitivity control could be as simple as a table lookup. For each unit of physical movement, an adjusted number of mickies is reported based on the current setting of the sensitivity control. For example, if the sensitivity is set to an intermediate value (normal), one mickie might be reported to the system for every single unit of physical movement, but if it is set to a low value (slow), then the one mickie might be reported to the system for every n unit of movement (this implementation would require counting movement units and reporting a mickie to the host only after n units of movement—effectively dividing the number of movement units by n), and if the sensitivity is set high (fast), then speed adjustment circuits 66, 68 would report an increased number of mickies for each unit of physical movement (i.e., one additional mickie for every n unit of movement). Additional settings can be provided with different additive or subtractive factors, and if many such settings are provided, the control has effectively continuous adjustment capability. Based on the settings desired, speed adjustment circuits 66 and 68 can be constructed accorded to known techniques using discrete logic gates or in a custom logic circuit. Alternative techniques can be used, such as those described in the aforementioned U.S. patent application Ser. No. 08/581,856 (using frequency shifters or flip-flop cascades).

FIG. 3 also illustrates two acceleration circuits 74, 76 that can selectively be applied to the outputs of each of the speed-adjustment circuits 66, 68. In this embodiment, as with pointer device 30, there is only on/off acceleration capability, implemented by a switch 78 (slider switch 50) connected to each acceleration circuit; each accelerator is identical, i.e., provides the same amount of acceleration, although the invention can be refined further by providing separate adjustment of acceleration for the X and Y axes. This non-linear response characteristic can be implemented in various ways, such as a multiplication of the number of mickies input or as a table-lookup controlled addition to the number of mickies input.

A pointing device constructed in accordance with the present invention has many advantages. Besides the primary functionalities of sensitivity (speed) control and acceleration control, the device provides a single source solution for a customizable mouse. The mouse user is able to purchase a mouse and configure mouse behavior without purchasing additional software or any other products, and does not need to install or maintain anything. This invention provides functionality which may not be otherwise available on the user's system. Most mouse software is oriented towards higher-volume operating systems, such as Microsoft Windows™. Other operating systems, such as UNIX, AIX, etc., may not have readily available mouse management software. A mouse having these features may further be perceived as easier to use by sophisticated users who dislike navigating various menus and panels to change mouse behavior, such as when a single system is used by multiple users (a home computer shared by all members of a family, for example).

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A pointer device adapted for use with a computer system having a video display, the device generating signals to control movement of a graphical pointer on the display, the device comprising:

a body;

movement means, supported by said body, for converting user manipulation into a first set of electrical signals representing motion of the graphical pointer along a first axis, and a second set of electrical signals representing motion of the graphical pointer along a second axis; and switch means for selectively modifying said first and second sets of electrical signals, in response to manual control, to vary the speed of the graphical pointer along said first axis and the speed of the graphical pointer along said second axis, wherein the speed of the graphical pointer along said first axis and the speed of the graphical pointer along said second axis are varied independently of one another.

2. The pointer device of claim 1 wherein said switch means is a first switch means, and further comprising second switch means for selectively modifying said electrical signals, in response to manual control independent of said manual control of said first switch means, to accelerate movement of the graphical pointer.

3. The pointer device of claim 1 wherein said first and second axes are orthogonal.

4. The pointer device of claim 1 wherein said body is adapted to fit in a hand.

5. The pointer device of claim 1 wherein said switch means includes first and second logic circuits for modifying said first and second sets of electrical signals, respectively.

6. The pointer device of claim 5 wherein said switch means provides first and second analog inputs to said first and second logic circuits, respectively.

7. The pointer device of claim 5 wherein said switch means provides first and second digital inputs to said first and second logic circuits, respectively.

8. In a computer system having a video display, means for moving a graphical pointer on said video display, and a pointing device having means for converting user manipulation into a first set of electrical signals representing motion of the graphical pointer along a first axis on said video display, and a second set of electrical signals representing motion of the graphical pointer along a second axis on said video display, the improvement comprising:

switch means for selectively modifying said first and second sets of electrical signals, in response to manual control, to vary the speed of the graphical pointer along said first axis and the speed of the graphical pointer along said second axis, wherein the speed of the graphical pointer along said first axis and the speed of the graphical pointer along said second axis are varied independently of one another.

9. The computer system of claim 8 wherein:

said first and second axes on said video display are orthogonal;

said pointing device is located in a body separate from the remaining computer system, said body being adapted to slide across a surface to render said user manipulation; and said first set of electrical signals is based on movement of said body along a first physical axis, and said second set of electrical signals is based on movement of said body along a second physical axis, wherein said first and second physical axes are also orthogonal.

* * * * *